July 2, 1957  C. G. GORDON  2,798,209
CONTROL FOR WELDING APPARATUS
Filed Sept. 21, 1953  5 Sheets-Sheet 1

INVENTOR.
CARROLL G. GORDON,
By His Attorneys
HARRIS, KIECH, FOSTER & HARRIS.

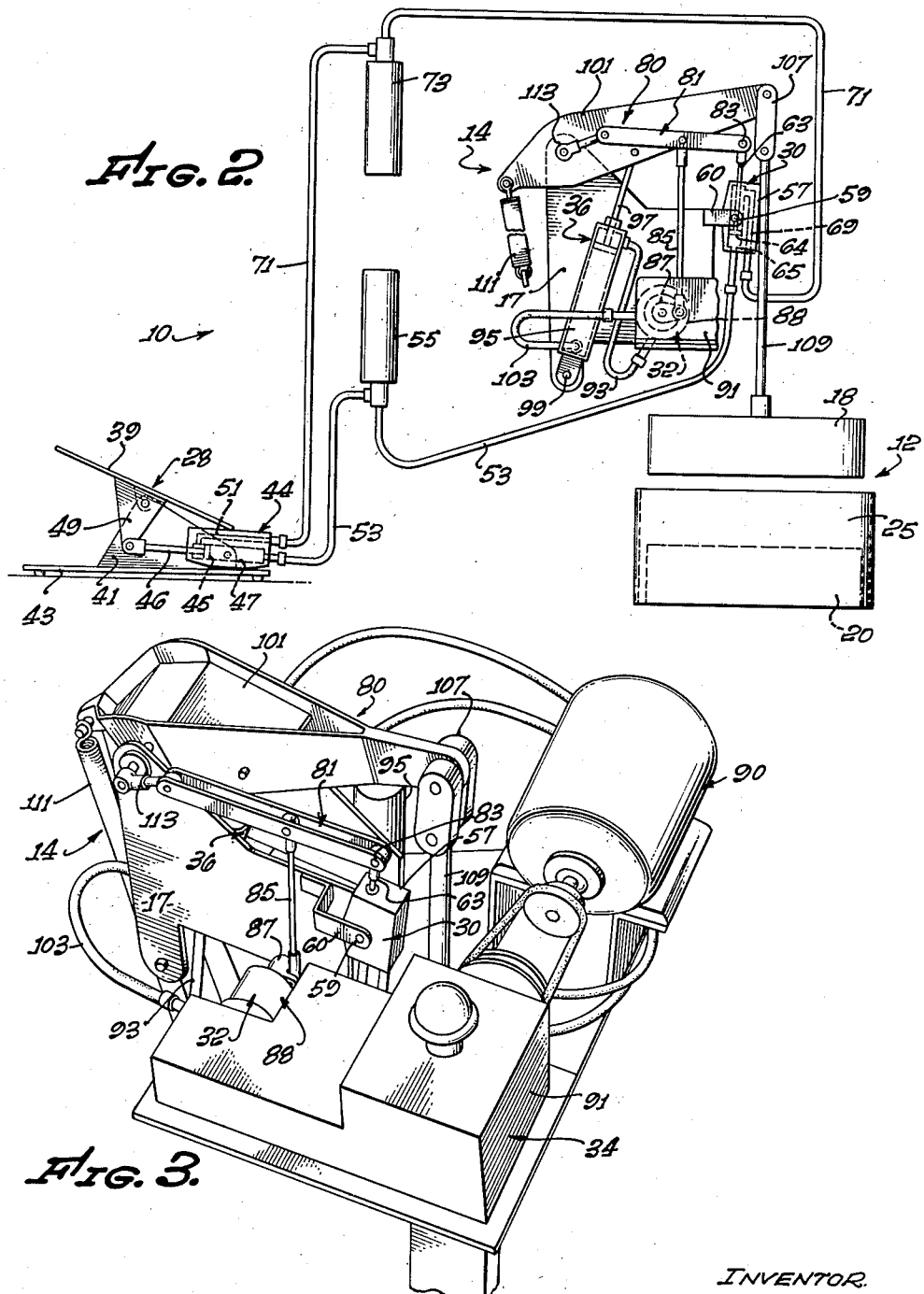

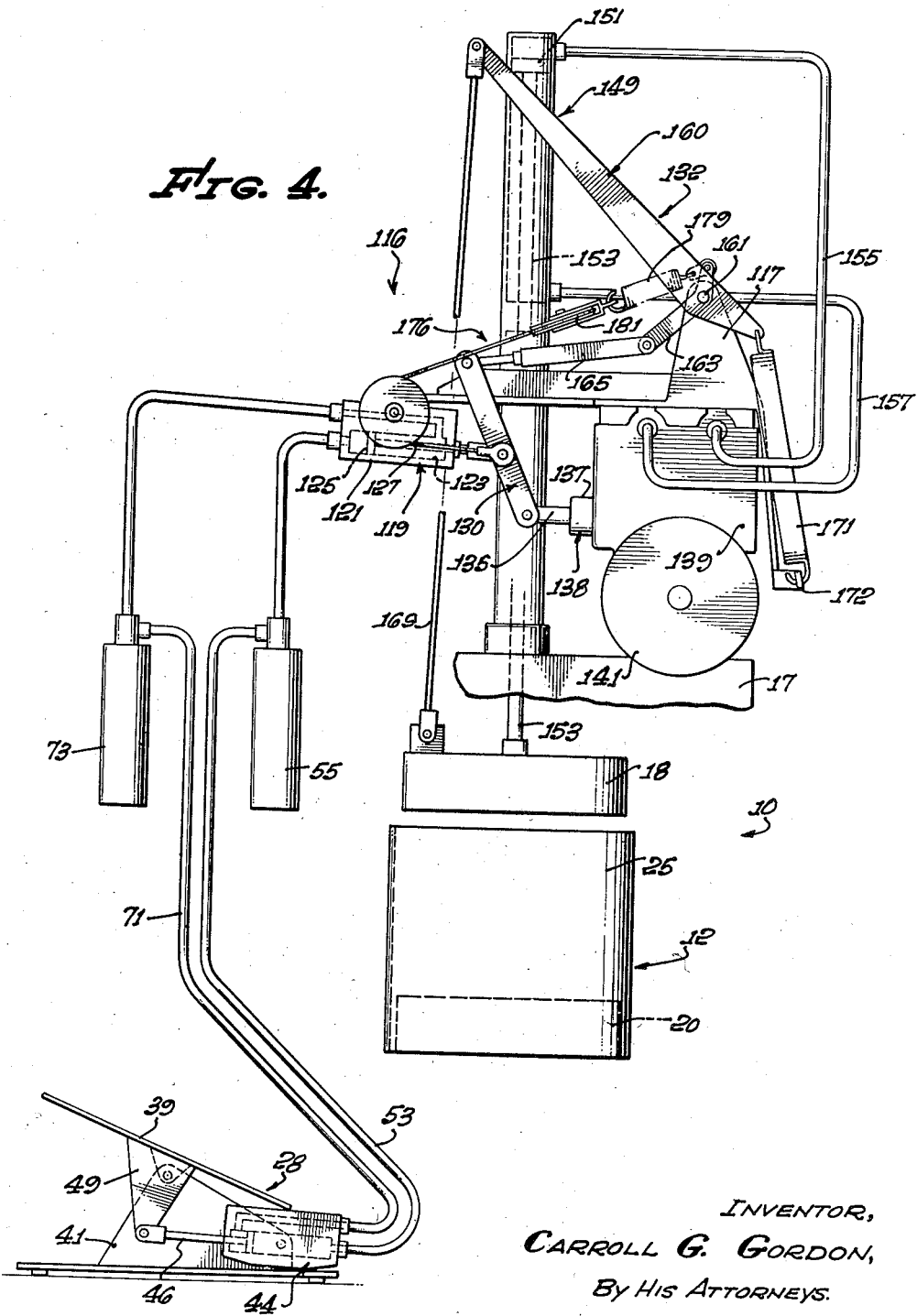

July 2, 1957  C. G. GORDON  2,798,209
CONTROL FOR WELDING APPARATUS
Filed Sept. 21, 1953  5 Sheets-Sheet 4

INVENTOR.
CARROLL G. GORDON,
By His Attorneys
HARRIS, KIECH, FOSTER & HARRIS.

July 2, 1957  C. G. GORDON  2,798,209
CONTROL FOR WELDING APPARATUS
Filed Sept. 21, 1953  5 Sheets-Sheet 5

INVENTOR.
CARROLL G. GORDON,
By His Attorneys
HARRIS, KIECH, FOSTER & HARRIS.

United States Patent Office 2,798,209
Patented July 2, 1957

2,798,209

CONTROL FOR WELDING APPARATUS

Carroll G. Gordon, Pasadena, Calif., assignor to Fletcher Aviation Corporation, Pasadena, Calif., a corporation of California Application September 21, 1953, Serial No. 381,456

9 Claims. (Cl. 336—117)

This invention relates to a welding control system for use in controlling the position of a movable component of a welding apparatus and, more particularly, to a system for controlling the position of the movable coil of a welding apparatus to control the output of electrical energy by said apparatus.

In order to describe the construction and mode of actuation of a control system constructed in accordance with my invention, I will describe it as embodied in a welding apparatus associated with an inert gas, shielded, arc welding torch but it is, of course, obvious that the principles of my invention can be applied with equal cogency to welding apparatus of a wide variety of constructions.

In conventional welding apparatus, means are usually provided for translating the coil of the variable transformer incorporated in the apparatus, such means usually consisting of hand-actuated lead screws or solenoid operated controls which do not provide the immediate response and accurate positioning which are necessary in many welding operations.

It is, therefore, an object of my invention to provide a welding control system for a welding apparatus incorporating a movable component which is characterized by sensitivity of response to actuation of a manually operable control member and which is so constructed that the operator fatigue encountered in conventional control systems is eliminated.

Another object of my invention is the provision of a welding control apparatus for controlling the position of the coil of a variable transformer incorporated in said apparatus, said apparatus including a manually operable control member, such as a foot pedal, hand wheel, or the like, and incorporating power means responsive to the energization of said control member for translating said coil to vary the output of electrical energy from said apparatus.

An additional object of my invention is the provision in a system of the aforementioned character of a manually operable control member which governs the energization of a master control member, said master control member, in turn, controlling the actuation of a slave member which determines the output of the power source incorporated in the control system so that the translation of the coil of the transformer is accomplished with a minimum of effort on the part of the operator of the apparatus.

A further object of my invention is the provision in a control system of the aforementioned character a feedback means associated with the coil of the transformer, said feed-back means being designed to integrate the movement of the coil with the displacement of the slave member by the master control member of the control system, thus reducing the possibility of over-travel of the coil and excess power output by the apparatus.

Another object of my invention is the provision in a system of the aforementioned character of an integrating linkage between the movable coil and the slave member, said integrating linkage serving to integrate the movement of said coil with the actuation of said slave member by the master control member so that the signal imposed upon the slave member by the master control member is ultimately cancelled by the feed-back signal from the coil through the integrating linkage.

A further object of my invention is the provision of a control system of the aforementioned character which includes in the aforesaid integrating linkage a lost motion connection which permits the initial energization of the slave member by the master control member and which is brought into play during the initial energization of said slave member by the master control member.

Another object of my invention is the provision of a hydraulic control system for a welding apparatus which includes a manually operable primary control member having associated therewith a master hydraulic control member which governs the operation of a hydraulic slave member. (Other equivalent means, such as a synchro system, may also be used.) incorporated in the system and having its output controllable by the aforesaid slave member is a hydraulic power pack, said power pack having its output operatively connected to a hydraulic motor which translates the coil of the apparatus to control the output of electrical energy thereby.

An additional object of my invention is the provision of a control system of the aforementioned type in which an integrating linkage is provided between the coil of the transformer and the hydraulic slave member in order to impress a feed-back signal from the coil on the slave member to integrate the movement of the coil by the hydraulic motor with the movement of the slave member by the master control member.

A further object of my invention is the provision of a control system of the aforementioned character in which said linkage incorporates an integrating link designed to integrate the movement of the coil of the transformer of the apparatus with the movement of the aforesaid hydraulic slave member.

Another object of my invention is the provision of a hydraulic control apparatus of the aforementioned character which is relatively simple in construction and mode of operation and which is designed to sustain long periods of hard usage without appreciable wear.

Other objects and advantages of my invention will be apparent from the following specification and the accompanying drawings which are for the purpose of illustration only and in which:

Fig. 2 is a schematic diagram of the component parts of the welding control system shown in Fig. 1;

Fig. 3 is a perspective view of the welding control system shown in Figs. 1 and 2;

Fig. 4 is a side elevational view of an alternative embodiment of the welding control system of my invention;

Figure 1:
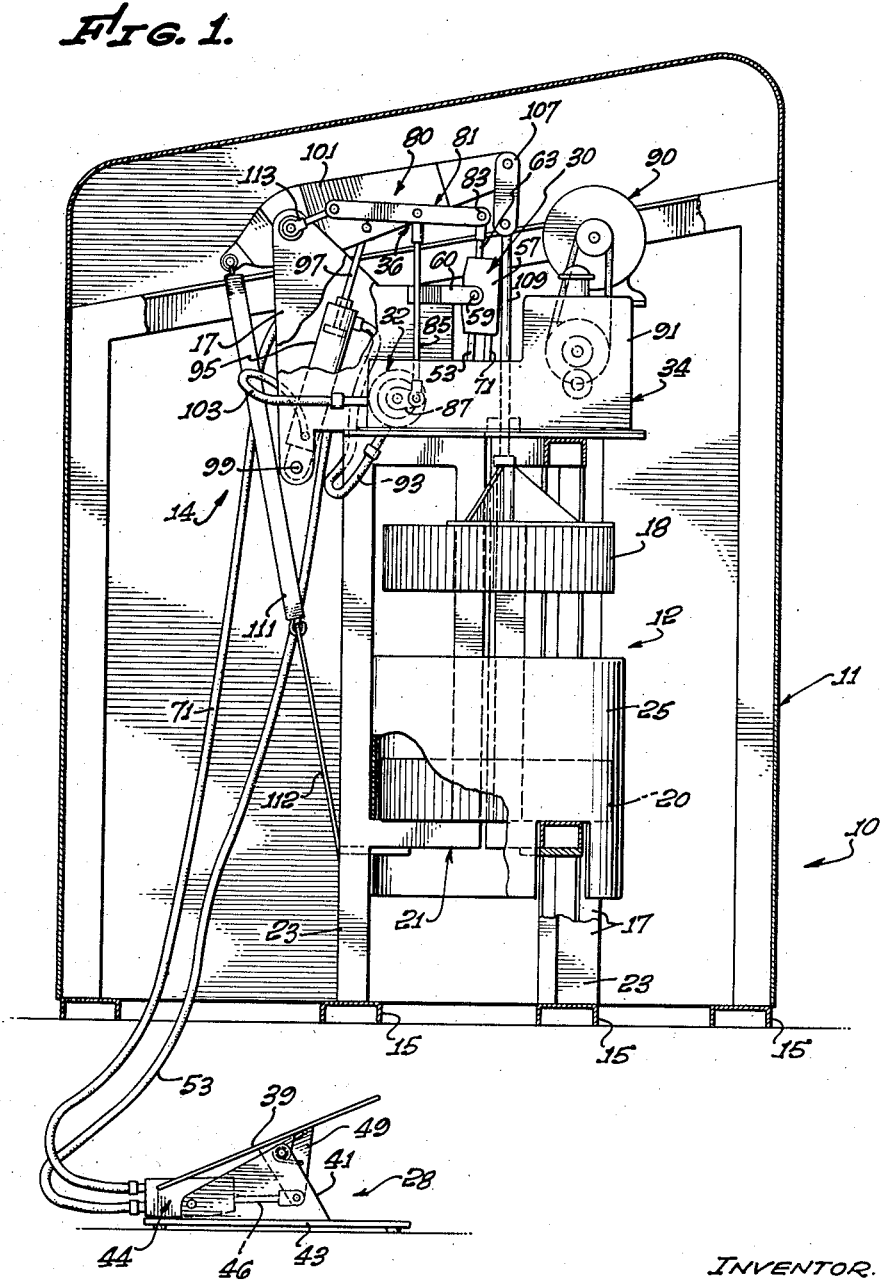
Fig. 1 is a partly sectional, partly side-elevational view of a welding apparatus incorporating a welding control system constructed in accordance with my invention.

Referring to the drawings, and particularly to Figs. 1–3 thereof, I show a welding apparatus 10, said apparatus including a housing 11 which incorporates a variable transformer, indicated generally at 12. It should be understood that component portions of the welding apparatus 10, other than those pertinent to the disclosure of the invention, are not shown in the drawings for the purpose of simplicity of disclosure.

Associated with the variable transformer 12 and designed to control the same is a control system 14 constructed in accordance with my invention. The housing 11 of the welding apparatus 10 includes a plurality of base beams 15, two of said beams supporting a frame 17 which mounts the variable transformer 12 and the major portion of the welding control system 14. The variable transformer 12 includes a vertically translatable coil 18 and a fixed coil 20, said fixed coil being supported by the magnetic field frame 21 which is, in turn, supported at its lowermost end on columns 23 fixed to the beams 15. A cylindrical shield 25 encompasses the fixed coil 20 and is designed to receive the movable coil 18 as it is lowered toward the fixed coil 20 to increase the output of electrical energy by the transformer 12.

The welding control system 14 includes, generally, a primary control member 28 which is operatively connected to a master control member 30 and designed to accomplish the energization of said master control member. The master control member 30 operates a slave control member 32 which, in turn, determines the output of a power pack 34 (Fig. 3). The power pack 34 is operatively connected to a motor 36 (Fig. 2) which is, in turn, connected to the movable coil 18 to cause the vertical translation thereof.

The primary control member 28 includes a treadle 39, said treadle being pivotally mounted on brackets 41 secured to a base plate 43. Pivotally mounted on the brackets 41 is a hydraulic actuator or transmitter 44, said actuator, as best shown in Fig. 2 of the drawings, including a piston 45 having a piston rod 46 connected thereto and translatable in a cylinder 47. The outermost end of the piston rod 46 is pivotally connected to an arm 49 secured to the underside of the treadle 39. The hydraulic actuator 44 is also provided with a return passage 51 for returning fluid into the cylinder 47. The output of the cylinder 47 is connected to the master control member 30 by means of a line 53, said line having interposed therein a hydraulic accumulator 55 which is designed to maintain the pressure in the line above operating pressure and avoid air bubbles therein which would interfere with the operation of the welding control system 14. Therefore, when the treadle 39 of the primary control member 28 is depressed, the piston rod 46 is shifted to the right, Fig. 2, and pressure fluid is expelled from the cylinder 47 into the line 53 and fed into the master control member 30 which is constituted by a hydraulic actuator 57 pivotally mounted at 59 upon brackets 60 which are secured to the upper end of the frame 17.

The hydraulic actuator 57, as best shown in Fig. 2 of the drawings, includes a piston rod 63 having a piston 64 thereupon which is reciprocable in a cylinder 65, said cylinder being connected at its lowermost end to the output from the hydraulic actuator 44 through the line 53. The hydraulic actuator 57 is also provided with a return passage 69, said return passage being connected by means of a return line 71 to the return passage 51 of the actuator 44. It will be noted that the return line 71 has incorporated therein a hydraulic accumulator 73 of the same construction as the hydraulic accumulator 55 and performing the same function in the line 71 as the hydraulic accumulator 55 performs in the line 53.

An integrating linkage 80 whose function will be described in greater detail below incorporates integrating links 81, said links being pivotally connected, as at 83, to one end of the piston rod 63. Pivotally secured intermediate the ends of each integrating link 81 is a push rod 85, said push rod being pivotally connected at its lowermost end to a crank 87 which controls the operation of the slave control member 32 which is constituted in the present embodiment of my invention by a hydraulic valve 88.

The hydraulic valve 88 is designed to control the output of the power pack 34, which consists of an electric motor 90 and a hydraulic reservoir and pump combination 91. The output of the reservoir and pump combination 91 is connected through a line 93 to the motor 36, said motor being constituted by a hydraulic cylinder 95 having a piston and piston rod combination 97 disposed therein. The lowermost end of the hydraulic cylinder 95 is pivotally mounted for movement on the frame 17, as at 99, and the outer end of the piston rod 97 is pivotally secured to an elongated lever arm 101 which is, in turn, pivotally mounted intermediate its ends on the frame 17. A return line 103 connects the end of the hydraulic cylinder 95 to the combination reservoir and pump 91.

Therefore, when the treadle 39 of the primary control member 28 is depressed, the actuation of the hydraulic actuator thereby will cause simultaneous energization of the hydraulic actuator 57 constituting the master control member 30. Due to such actuation, the piston rod 63 of the hydraulic actuator 57 will be extended from the body of said actuator to cause upward movement of the end of the integrating link 81 and concomitant upward movement of the push rod 85 which, in turn, rotates the crank 87 associated with the slave control member 32 in an appropriate direction to meter pressure fluid through the line 93 into the cylinder 95 and thus cause the retraction of the piston rod 97 thereinto to move the lever arm 101 in a downward direction. The downward movement of the lever arm 101 is communicated to the movable coil 18 of the transformer 12 by means of a link 107 and a connecting rod 109. Thus, it can be seen that the energization of the primary control member 28 will cause concomitant movement of the movable coil 18 in the above described manner and that, since the pressure fluid in the lines 53 and 71 is maintained at a maximum operating pressure and the actual translation of the movable coil 18 is accomplished by the power pack 34, the amount of effort expended by the operator is negligible and the fatigue encountered in the use of ordinary welding control systems is eliminated.

Connected to the left-hand end of the lever arm 101 is a tension spring 111 whose lower end is secured to a tie bar 112 fastened to the frame 17. Therefore, the tension spring 111 resists downward deflection of the lever arm 101 and tends to continually act to return the lever arm 101 by balancing the weight of the coil 18. Thus, when the treadle 39 of the primary control member 28 is returned to a neutral position, the tension spring 111 will function to assist in returning the lever arm 101 and the movable coil 18 to their uppermost positions, thus providing the same coil travel characteristics in both directions.

Fixedly secured to the pivot upon which the lever arm 101 rotates is a crank arm 113 which is connected to the ends of the integrating links 81 most remote from the point of pivotal affixation of the piston rod 63 to said links at 83. Therefore, as the lever arm 101 is rotated by the action of the hydraulic cylinder 95, the crank 113 fixedly attached thereto is rotated in the same direction to cause downward deflection of the integrating link 81 in opposition to the upward deflection of said link caused by the extension of the piston rod 63 from the actuator 57 constituting the master control member 30. Thus, the elongated lever arm 101, the crank arm 113, and the integrating links 81 constitute component portions of the integrating linkage 80 and serve to impress a feed-back signal on the slave control member 32 in a direction contrary to the original signal impressed thereupon by the master control member 30. Thus, once initial movement of the lever arm 101 in a downward direction occurs, an immediate feed-back signal is impressed through the integrating linkage 80 upon the slave control member 32 which serves to cancel the signal originally impressed thereupon by the master control member 30. Since the movement of the integrating linkage 80 is directly proportional to the downward movement of the movable coil 18, the slave control member 32 will be positioned by the action of the integrating linkage 80 to maintain the movable coil 18 in a desired position but will prevent under overtravel and over-control of the movable coil 18.

It should be noted at this juncture that the pivotal mounting of the master control member 30 permits it to automatically assume a position in which the extension of the piston rod 63 can be accomplished in a straight line without binding on the pivotal connection to the integrating links 81 at 83. Furthermore, the hydraulic cylinder 95 is also pivoted at its lower end on the frame 17 so that the cylinder can freely rotate about an axis at its point of pivotal attachment 99 to lower and raise the elongated lever arm 101.

Figure 5:
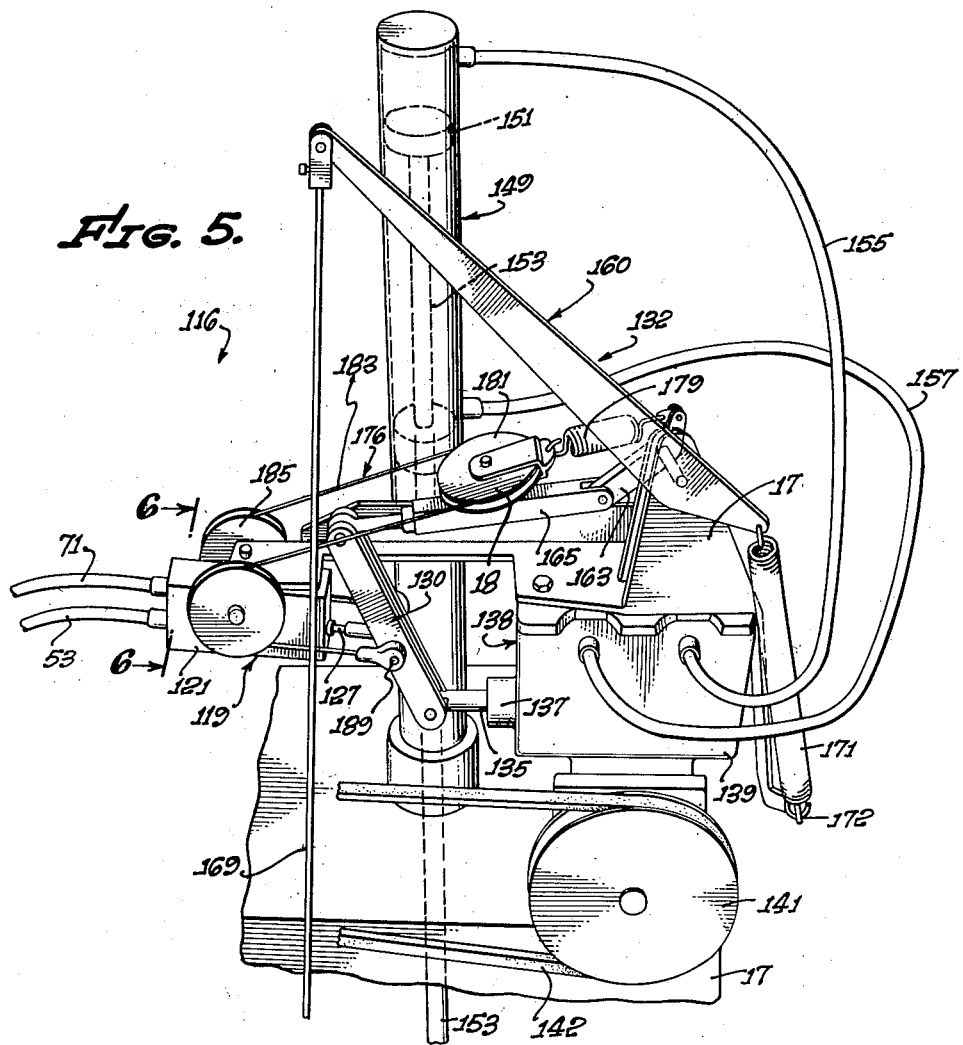
Fig. 5 is a perspective view of a portion of the welding control system of Fig. 4.
Figure 6:
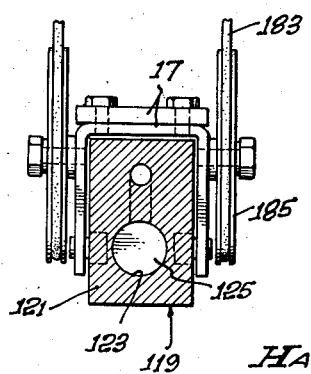
Fig. 6 is a vertical, sectional view taken on the broken line 6—6 of Fig. 5.

Another embodiment of my invention is designated by the numeral 116 in Figs. 4 to 6 of the drawings, wherein reference numerals identical to those previously utilized in identifying component portions of the welding apparatus 10 are applied to said component portions in Figs. 4 to 6. The welding control system 116 includes, in addition to the identical primary control member 28 of the previously discussed embodiment of the invention, a master control member 119, said master control member being constituted by a hydraulic actuator 121 pivotally mounted on a portion of the frame 17 and including a cylinder 123 having a piston 125 and a piston rod 127 disposed therein. Pivotally mounted intermediate their ends on the outermost end of the piston rod 127 are integrating links 130, said links constituting a portion of an integrating linkage 132 to be described in greater detail below.

The lowermost ends of the integrating links 130 are pivotally secured to a control piston rod 135 of a hydraulic valve 137 which constitutes the slave control member 138 of the presently discussed embodiment and which is also an integral portion of a hydraulic power pack 139 which is rigidly secured to the frame 17 and which is provided with a drive wheel 141 energizable through a belt 142 by an electric motor, not shown.

Rigidly affixed to the frame 17 is a hydraulic cylinder 149 incorporating a piston 151 and a piston rod 153, the lowermost end of which is secured to the movable coil 18 of the transformer 12 to cause upward or downward movement of said movable coil in response to metering of pressure fluid from an output line 155 connected to the output of the power pack 139. A return line 157 returns hydraulic fluid from the cylinder 149 to the power pack 139. Therefore, when the treadle 39 of the primary control member 28 is depressed, extension of the piston rod 127 from the cylinder 123 of the hydraulic actuator 121 will result, causing displacement of the integrating link 130 to the right, as best shown in Figs. 4 and 5 of the drawings, thus causing simultaneous movement of the piston 135 of the valve 137 and permitting the power pack 139 to meter pressure fluid through the output line 155 to the hydraulic cylinder 149. The pressure fluid causes downward movement of the piston 151 and its associated piston rod 153, thus translating the movable coil 18 downwardly in a direction toward the fixed coil 20 of the welding transformer 12.

The integrating linkage 132 includes an elongated lever arm 160 which is pivotally mounted on the frame 17 at 161 and has fastened thereto for rotation therewith a bellcrank 163. Secured to one arm of the bellcrank 163 is one end of a connecting rod 165 whose opposite end is pivotally secured to the uppermost ends of the integrating links 130. The left-hand end of the elongated lever arm 160, as best shown in Figs. 4 and 5 of the drawings, has a cable 169 fastened thereto, the lowermost end of which is connected to the movable coil 18 of the welding transformer 12.

Secured to the opposite end of the elongated lever arm 160 is a tension spring 171 whose lowermost end is affixed to a bracket 172 on the frame 17 and which normally tends to bias the end of the arm 160 to which it is secured downwardly to raise the movable coil 18 of the welding transformer 12 into a position in which the least electrical energy will be produced by the welding transformer 12.

Thus, when the piston rod 127 of the hydraulic actuator 121 is shifted to the right by the energization of the primary control member 28 and initial downward movement of the movable coil 18 of the welding transformer 12 occurs due to the longitudinal displacement of the piston rod 135 of the valve 137, a feed-back signal from the movable coil 18 through the cable 169 and the integrating linkage 132, constituted by the arm 160, the bellcrank 163, the connecting rod 165, and the integrating links 130, is thus impressed in a direction contrary to the initial signal impressed on the integrating links 130. Thus, the feed-back signal causes the integrating links 130 to be pivoted on the outermost end of the piston rod 127 in a direction opposite to that in which the integrating links 130 were initially carried by the movement of the piston rod 127, thus serving to move the lowermost ends of the integrating links 130 in a leftward direction to cancel the original signal from the hydraulic actuator 121 constituting the master control member 119 and to return the slave control member 138 to its original position. In this manner, over-control and over-travel of the movable coil 18 are eliminated and the movement of the movable coil 18 is integrated with the movement of the piston rod 135 of the valve 137.

Secured in the integrating linkage 132 and constituting a component portion thereof is a lost motion connection 176, said lost motion connection including a tension spring 179 pivotally connected between another arm of the bellcrank 163 and a pulley 181 having trained thereupon a cable 183, the ends of which are reeved around pulleys 185 on the frame 17 and secured to the pivot on which the integrating links 130 are mounted as at 189. Therefore, when the master control member 119 is initially energized by the actuation of the primary control member 28, the lost motion connection 176 permits initial movement of the piston rod 127 by extension of the tension spring 179. When the initial movement of the piston rod 127 is accomplished, the spring 179 returns to its normal state and re-establishes the rigid connection through the integrating linkage 132 and, more particularly, the integrating links 130 thereof.

Figure 7:
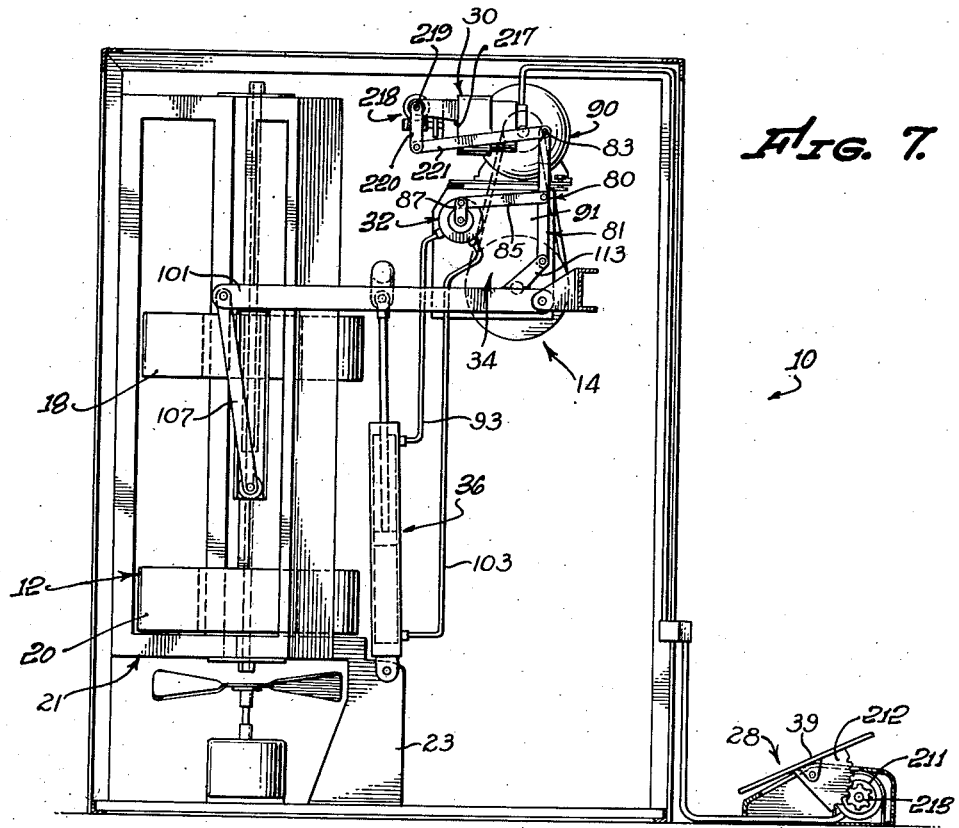
Fig. 7 is a side elevational view of another embodiment of the welding control system of my invention.
Figure 8:
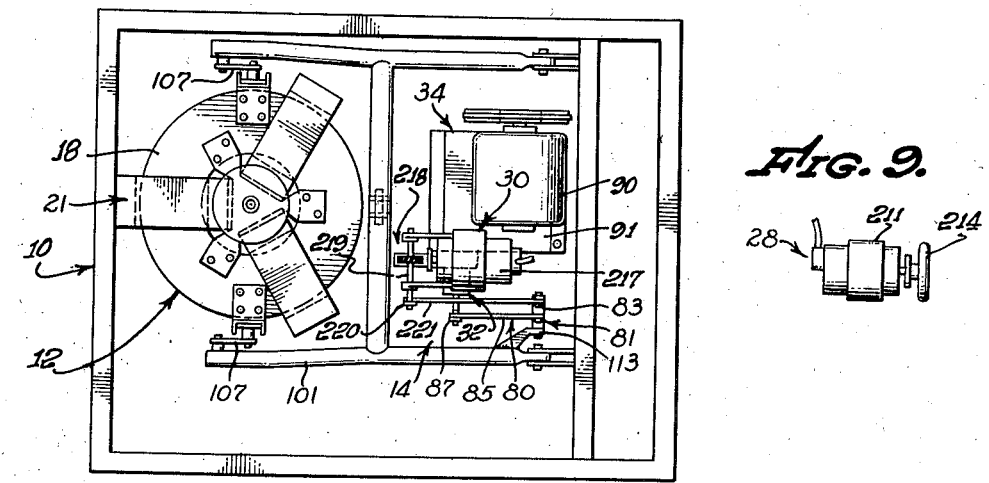
Fig. 8 is a top plan view of the welding control system of Fig. 7.

Figs. 7 and 8 show an embodiment which is generally similar to that shown in Fig. 1 of the drawings, the same reference numerals being utilized insofar as applicable. The embodiment of Figs. 7 and 8 utilizes increased coil travel for the transformer 12 to obtain a greater heat range, which makes it desirable to place the control unit beside the transformer instead of on top of it.

Figure 9:
Fig. 9 is a view of an alternative control member for use with the embodiment of Figs. 7 and 8.

The hydraulic actuator or transmitter 44 is replaced by an electrical actuator or transmitter, shown as a master synchro 211, which is operated by a gear segment 212 on the treadle 39, this gear segment being meshed with a gear 213 on the synchro shaft. Alternatively, the master synchro 211 may be operated by a knob or handwheel 214, Fig. 9, on its shaft. The master synchro 211 is connected to and controls a slave synchro 217 in the usual manner, the connecting circuitry being shown diagrammatically only since it is conventional. The slave synchro 217, through a worm gear means 218, drives a shaft 219 having a crank 220 thereon, the latter being connected, at 83 and by a link 221, to the integrating link 81. Except for the modifications incurred by the foregoing differences, the operation of the embodiment of Figs. 7 and 8 is similar to that of Figs. 1 to 3, the principal advantages of the embodiment of Figs. 7 and 8 being that it provides more sensitive and accurate welding heat control and is better adapted to remote control.

The balancing spring 111 has been omitted from Figs. 7 and 8 for clarity, but it may be added if desired, the spring 111, if used, being arranged to pull upwardly on the lever arm 101, here shown as an H frame.

I thus provide by my invention a welding control system which is characterized by extreme ease and accuracy of operation and which provides very accurate control of the welding transformer. Furthermore, by the utilization of the principles of my invention in welding control systems, it is possible to eliminate employee fatigue which frequently results from the use of conventional systems. This reduction in employee fatigue is attributable to the fact that the control system incorporates master and slave means in association with each other, whereby the actual translation of the movable coil of the welding transformer is accomplished through a power pack incorporated in the system.

The accuracy of control inherent in the welding control system of my invention is attributable, in large part, to the incorporation of feed-back means constituted by the integrating linkage of the system, whereby a signal contrary in direction to the signal impressed on the slave by the master is utilized to modulate the original master signal.

I claim as my invention:

1. In a welding control system for varying the output of a welding apparatus which includes a variable transformer, the combination of: a manually operable control member; a master motor responsive to actuation of said control member and operatively connected thereto; a slave valve operatively connected to said master motor and actuable thereby; a power source whose output is controlled by said slave valve; a motor energizable by said power source and connected to a movable portion of said variable transformer; and an integrating linkage connecting said movable portion of said transformer to said slave valve to determine the ultimate operative position of said slave valve.

2. In a welding control system for controlling the output of a welding apparatus incorporating means for varying the electrical energy output of said apparatus, the combination of: a manually operable control member; master control means operatively connected to said manually operable control member and responsive to the energization thereof; slave control means operable by said master control means; a power source whose output is governed by said slave means; a motor energizable from said power source and connected to said varying means; and a linkage between said varying means and said slave means for impressing a signal on said slave means to regulate the energization thereof by said master control means.

3. In a hydraulic welding control apparatus for regulating electrical output varying means in said apparatus, the combination of: a hydraulic actuator; a master motor in series with said hydraulic actuator; a slave valve operatively connected to said master motor; power means whose energization is controlled by said slave valve, said power means being operatively connected to said varying means to control the electrical output thereof; and means connecting said varying means to said slave valve to integrate the movement of said slave valve by said master motor with the movement of said varying means by said power means, said connecting means including a lost motion connection to permit the initial operation of said slave valve by said master motor.

4. In a hydraulic welding control apparatus for regulating electrical output varying means in said apparatus, the combination of: a hydraulic actuator; a slave valve operatively connected to said master motor; power means whose energization is controlled by said slave valve, said power means being operatively connected to said varying means to control the electrical output thereof; and an integrating linkage connecting said varying means to said slave valve, said linkage including integrating arm means operatively connected at one end to said varying means and intermediate its ends to said slave valve, movement of said varying means by said power means causing movement of said integrating arm means to cancel the signal impressed on said slave valve by said master motor.

5. In a welding control system for an arc welding apparatus including means for varying the electrical energy impressed at said arc, the combination of: a primary actuator; a power source operatively connected to said primary actuator having a variable output and being responsive to the energization of said primary actuator; means connecting said varying means to said power source to cause the energization of said varying means from said source; and an integrating linkage connecting said varying means to said power source to impress a signal thereupon which is contrary in direction to the signal impressed upon said power source by said primary actuator.

6. In a control system for an arc welding apparatus having means for varying the electrical output of said apparatus, the combination of: a source of motive power; a motor operatively connected to said source for moving said varying means; and an integrating linkage connected between said varying means and said source, said integrating linkage being responsive to movement of said varying means by said motor to provide a feed-back signal cancelling an original signal impressed on said source.

7. In a welding control system for a welding apparatus having a current varying means, the combination of: a primary actuator; a master motor connected to and energizable by said primary actuator; a control link connected to said master motor; a slave connected to said control link and responsive to the displacement thereof by said master motor; a power source whose output is governed by said slave; a motor energizable by said power source and connected to said varying means; and means connecting said varying means to said link to feed back movement of said varying means to said link and integrate said movement with that of said master motor.

8. In a welding control system for a welding apparatus having a current varying means, the combination of: a primary actuator; a master motor connected to and energizable by said primary actuator; a control link pivotally connected to said master motor; a slave pivotally connected to said control link and responsive to the displacement thereof by said master motor; a power source whose output is governed by said slave; a motor energizable by said power source and connected to said varying means; and means connecting said varying means to said link to feed back movement of said varying means to said link and integrate said movement with that of said master motor.

9. In a welding control system for a welding apparatus having a current varying means, the combination of: a primary actuator; a master motor connected to and energizable by said primary actuator; an integrating control link connected to said master motor; a slave connected to said control link and responsive to the displacement thereof by said master motor; a power source whose output is governed by said slave; a motor energizable by said power source and connected to said varying means; and means connecting said varying means to said link to feed back movement of said varying means to said link and integrate said movement with that of said master motor.

References Cited in the file of this patent

UNITED STATES PATENTS

| | | |
|---|---|---|
| 1,628,148 | Hubble | May 10, 1927 |
| 2,516,449 | Coates | July 25, 1950 |
| 2,620,772 | McLane | Dec. 9, 1952 |

FOREIGN PATENTS

| | | |
|---|---|---|
| 604,798 | Germany | Oct. 30, 1934 |